Patented Nov. 19, 1940

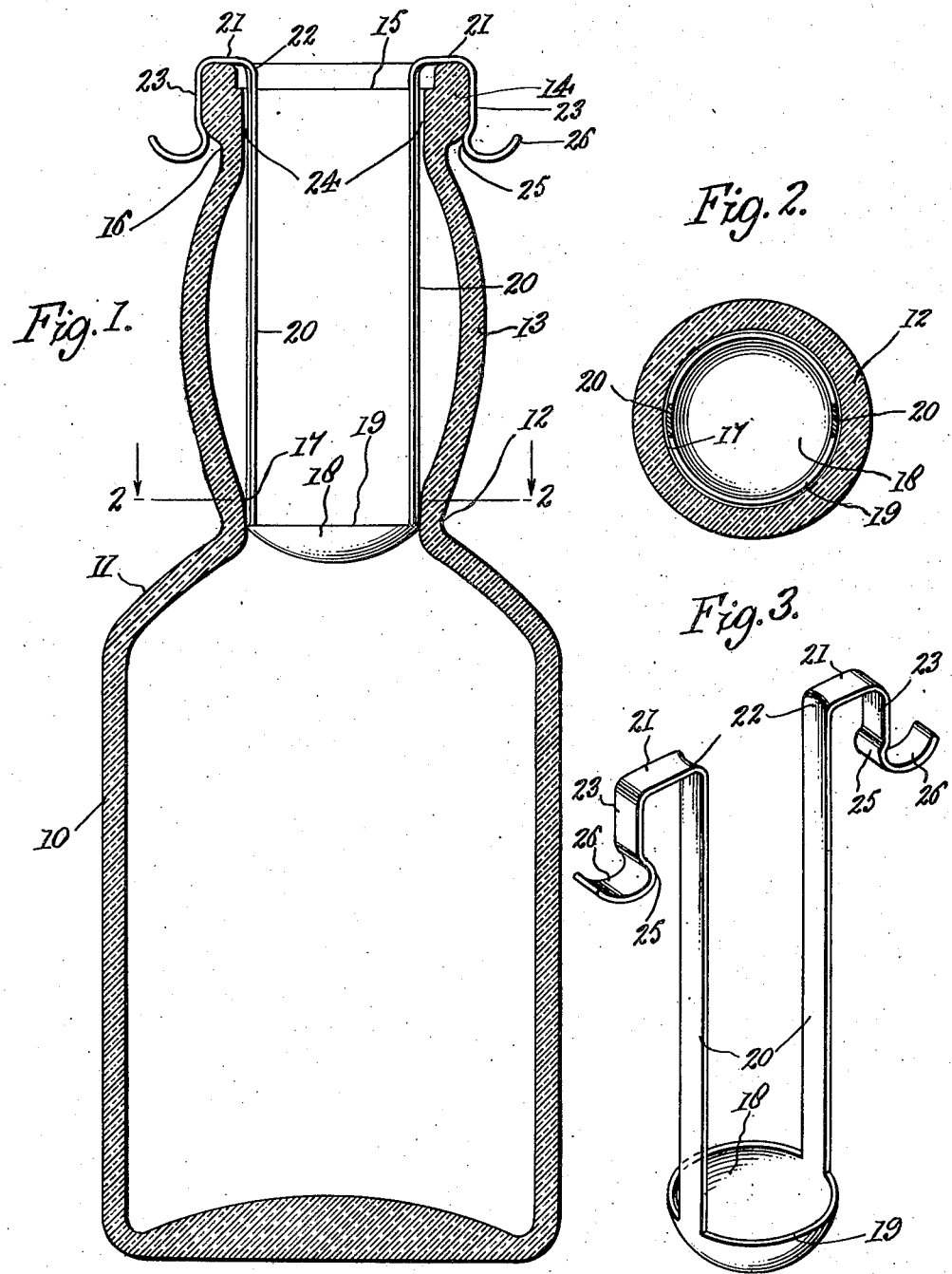

2,222,511

UNITED STATES PATENT OFFICE 2,222,511

CREAM SEPARATING MILK BOTTLE

Raymond W. McAlister, New York, N. Y.

Application November 21, 1939, Serial No. 305,538

2 Claims. (Cl. 210—51.5)

The present invention relates to improvements in cream separating milk bottles, and has for an object to provide a bottle having a neck construction narrow horizontally and elongated vertically for the purpose of holding and exhibiting the cream fraction of the milk to better advantage, and so constructed as to lend itself in a peculiarly novel way to cooperate with a milk separating attachment of an improved form.

It is another object of the invention to provide a milk separating attachment for a milk bottle in which the attachment is so constructed as to interlock with the parts of the milk bottle when in its final position to dispense with the continuous attention of the housewife who may hold the bottle in one hand during the pouring operation, leaving the other hand entirely free for other operations, such for instance as the holding of a container into which the cream is being poured.

A further object of the invention resides in providing an improved cooperating milk bottle and cream separating attachment in which the modification of the bottle from standard practice is in minimum points of construction having no effect on bottling procedure and in which the attachment is capable of being formed in one piece of sheet metal out of cheap stock by an economical single stamping process, and wherein the application of the attachment to the milk bottle, and its removal therefrom, are expeditious and easily accomplished by the housewife.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a side elevation, with parts broken away and parts shown in section, of an improved cream separating milk bottle constructed in accordance with the present invention with the cream separating attachment in place.

Figure 2 is a horizontal section taken on the line 2—2 in Figure 1.

Figure 3 is a perspective view of the cream separating attachment apart from the milk bottle.

Referring more particularly to the drawing, 10 represents a milk bottle of a form and size generally conforming to standard or conventional practice having a breastpart 11 constricting to the neck of the bottle which is peculiarly formed, consisting of a valve section 12, a vertically elongated bulged section 13 and a mouth section 14. In the mouth section is provided the usual seat 15 for the cardboard disc cover usually employed to close the bottle. The mouth portion 14 is thickened to produce a lip having the annular external groove 16 which is utilized in cooperation with the attachment as hereinafter more fully explained.

The valve section 12 is preferably thickened as to its cross-sectional wall in order to add strength to the bottle at this constricted area and in order also to afford an elongated tapering valve section or surface 17 on the inside of the section 12. This section 17 is in fact generated on the frustum of a cone which is inverted, the wider mouth of the valve surface 17 being disposed at its upper end, and the valve surface tapering downwardly to a more constricted diameter adjacent the breast 11.

The cream separating attachment is formed with a cup 18, being preferably a concavo-convex section of sheet metal or other appropriate material having the rim 19 having a normal diameter somewhat greater than the diameter of the constricted lower end of the valve surface 17 into which the cup 18 slidably fits as indicated in Figure 1.

Due to the inherent resiliency of the material of which the attachment is made, and due also to the favorable use made of that inherent resiliency by the formation of the cup 18 in a concavo-convex section, the rim 19 may expand and contract concentrically or diametrically, and thus in moving downwardly along the conical surface 17, the rim 19 will seek a position of tight fit against such conical valve surface 17. The rim 19 may be slightly contracted in forcing the cup 18 downwardly with reference to the more constricted lower portion of the valve surface 17, the cup 18 thus being put under slight tension which reacts against the valve surface 17 to form an extremely tight fit, this condition of tension being available with extreme lightness of pressure by reason of the fact that the rim 19 upstands from the dished body of the cup 18 and is diametrically and concentrically free and without interference in its expanding and contracting action. These cooperating parts therefore serve to produce a fluid tight valve of very high sealing properties.

The cup 18 is suspended between arms 20 which are preferably connected with the rim 19 at diametrically opposite points and may, for convenience of construction, be struck out from the same sheet of metal with the cup 18, being simultaneously or afterwards shaped up along with the same shaping method as produces the dishing of the cup 18. Such arms 20 will preferably be narrow so as to perform their function of inserting and removing the cup 18 without imparting undue rigidity to the rim 19 as would be the case with wider or thicker arms. Both the arms and the cup will be struck out of light gauge metal which will have the desirable flexibility and strength.

The arms 20 are sufficiently long to enable the cup 18 to be seated in the valve section 12 as indicated in Figure 1. At the upper ends the arms are outwardly turned to provide shoulders 21, such shoulders being flexible and resilient and adapted to rest upon the upper part or mouth 14 of the bottle when the cup 18 seeks a final position in the valve section 12.

Thus the shoulders 21 provide stops which permit of a limited adjustment of rim 19 with reference to valve seat 17 in that the shoulders 21 are free to flex upwardly about hinged points 22 with the arms 20 when forcing the cup 18 down to a light wedging position upon the frusto conical surface 17. In this way the flexibility of the shoulders 21 cooperates with the inverted frusto conical valve surface 17 and with the expansible and contractile rim 19 of the flexible and resilient concavo-convex cup 18.

From the outer ends of the shoulders 21, the metal is turned down, as indicated at 23, in substantial parallelism with the arms 20 and provides elbows which are spaced from the arms 20 a suitable distance to lie in contact with the outer surfaces of the lip or mouth 14 of the milk bottle. This condition is shown in Figure 1. The inherent resiliency of the metal in and about the upper ends of the arms 20 and the shoulders 21 will tend to draw the elbows 23 inwardly against the lip 14. It will also be noted in Figure 1 that the arms 20 stand inwardly from the inner wall of the lip 14 and that spaces 24 intervene between the arms 20 and such inner wall of the lip 14. This prevents binding at this point. It allows the arms 20 to have a limited lateral or diametric movement back and forth across the mouth of the milk bottle, such as may be necessary or desirable in freeing the rim 19 from the conical valve surface 17. Such spaces 24 also permit freedom of the resiliency in the metal of the arms 20, shoulders 21 and elbows 23 to the end that such inherent resiliency will tend to clamp the shoulders 21 down upon the top of the lip 14 and cause the elbows 23 to tightly hug the outer wall of the bottle lip 14.

At the lower free ends of the elbows 23 the metal is bent inwardly and downwardly to provide projections or latch noses 25 having rounded inner walls for seeking the annular grooves 16 of the milk bottle and interlocking under the lip 14. The inherent resiliency of the metal will tend to cause these noses 25 to approach one another across the diameter of the bottle neck and tend to force the noses 25 into the groove 16 thus binding the attachment firmly in place upon the bottle.

Curved fingers 26 are bent outwardly from the lower ends of the noses 25. These fingers extend out substantially horizontally and their incurved upper surfaces are made to conform generally to the curvature of the human fingers which they are positioned to receive in a downward motion of the hand when forcing the cup 18 into position.

In the use of the device, the improved milk bottle 10, conforming as it does to external standards, can be filled at the dairy plant by conventional filling machines and the paper disc caps put in place upon the seats 15. In this condition the bottles are delivered at the door of the customer and due to its lighter specific gravity the cream as usual will ascend to the top. The neck is thinner horizontally or diametrically and is a little longer vertically than the neck of the standard bottle in order to show the cream to better advantage and to provide for the easier insert of the cream separating attachment.

The housewife removes the disc cover from the seat 15 and inserts the attachment, moving the cup down through the body of cream in the neck. The cup 18 will freely pass down in the wide space 24 of the mouth and in the wider bulged section 13 the cream will have ample space to flow up around the cup 18 as it descends into place. The lower part of the valve section 12 will be at substantially cream line so that the cup 18 and its rim 19 will seat eventually on the valve surface 17 at such cream line, the cup 18 forming a barrier with a tight fit between the milk and the cream and preventing the milk from commingling with the cream permitting the cream to be poured from the bottle separate from the milk.

The attachment is put in place by simply moving the cup 18 and the arms 20 down within the elongated neck of the bottle until the shoulders 21 strike the upper end of the bottle at which time the rim 19 will seat upon the valve conical surface 17. At this same time the elbows 23 will embrace the bottle lip 14 and the latch noses 25 will have entered the annular groove 16. The final downward movement of the attachment may be accomplished by placing the fingers on the upper sides of the finger pieces 26 and exerting a downward force or push which will not only tend to move the cup 18 and the shoulders 21 downwardly but will tend to swing the inwardly crimped noses 25 into the annular recess 16. In this condition the bottle may be decanted and the cream poured while the milk is restrained in the bottle.

To detach the device the fingers are engaged beneath the finger pieces 26 and an upward force or push exerted which will tend to rotate the elbows 23 outwardly about the shoulders 21 thus causing the disengagement of the latch noses 25 from the undercut groove 16. The same upward push, after releasing the device will lift the attachment out of the bottle. As the device is lifted upwardly the crimped-in noses 25 will ride along the outer surfaces of the bottle lip 14 thus tending to pull the arms 20 outwardly, the spaces 24 allowing of this movement.

The use of two diametrically positioned arms 20, two shoulders 21, two elbows 23, two latch noses 25, and a pair of finger pieces 26, enables the attachment to be firmly latched in the bottle so that it need not be held in place by human hand. In other words the attachment maintains itself in the bottle and in a latched condition until forcibly removed manually from the bottle. This leaves the housewife with one hand free for other operations while the milk bottle is held and its contents decanted.

It is obvious that various changes and modifications may be made in the details of construction and design of the above specifically described embodiment of this invention without departing from the spirit thereof, such changes and modifications being restricted only by the scope of the following claims.

What is claimed is:

1. In a cream separating milk bottle, a bottle body, a narrow elongated neck on the body, an inverted frusto-conical valve surface in the lower part of said neck, said neck having an external groove near its upper part, a concavo-convex resilient cup having a freely expanding and contracting upper rim for seating against said conical valve surface, arms connected with said rim and having outturned upper portions for embracing the upper end of the bottle neck, said outturned portions of the arms having resilient inwardly projecting portions normally contracted into said groove, and means for disengaging the latches from the groove.

2. In a cream separating milk bottle, a bottle body, a neck thereon having an external overhanging lip and at its internal base portion an inverted frusto-conical valve surface, a cup of resilient material of concavo-convex form having a rim unsupported diametrically and freely contractible and expansible against the valve surface, narrow arms connected with diametrically opposite portions of said rim, resilient shoulders extending outwardly from the upper end portions of said arms and adapted to encounter the upper end of the bottle neck, said arms extending down from the outer ends of said shoulders for normally contacting the outside surface of the upper part of the bottle neck and extending outwardly to form curved finger pieces, said downwardly extending parts having inwardly projecting portions at their lower ends to engage beneath the overhanging external lip, the distance between the upper end portions of said arms and said downwardly extending portions being greater than the thickness of wall at these points of the bottle neck whereby to leave spaces between the arms and the adjacent inner surface of the bottle neck to permit limited movement horizontally of the arms.

RAYMOND W. McALISTER.